(12) United States Patent
Sawada et al.

(10) Patent No.: US 7,125,046 B2
(45) Date of Patent: Oct. 24, 2006

(54) SHOCK ABSORBING STEERING COLUMN DEVICE FOR VEHICLE

(75) Inventors: Naoki Sawada, Gunma-ken (JP); Kenji Sato, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/415,486

(22) PCT Filed: Sep. 11, 2002

(86) PCT No.: PCT/JP02/09258

§ 371 (c)(1),
(2), (4) Date: Apr. 30, 2003

(87) PCT Pub. No.: WO03/024763

PCT Pub. Date: Mar. 27, 2003

(65) Prior Publication Data

US 2004/0094945 A1 May 20, 2004

(30) Foreign Application Priority Data

Sep. 14, 2001 (JP) .............................. 2001-279687
Sep. 9, 2002 (JP) .............................. 2002-262949

(51) Int. Cl.
*B62D 1/11* (2006.01)

(52) U.S. Cl. .................................... 280/777

(58) Field of Classification Search ................ 280/774, 280/775, 777, 779; 74/493
See application file for complete search history.

(56) References Cited

U.S. PATENT DOCUMENTS

| | | | |
|---|---|---|---|
| 4,648,624 A | 3/1987 | Mouhot et al. | 280/775 |
| 4,733,575 A * | 3/1988 | Nakamura | 74/493 |
| 5,294,149 A | 3/1994 | Haldric et al. | 280/775 |
| 5,593,183 A | 1/1997 | Fouquet et al. | 280/775 |
| 5,730,465 A * | 3/1998 | Barton et al. | 280/775 |
| 5,857,703 A * | 1/1999 | Kinoshita et al. | 280/775 |

(Continued)

FOREIGN PATENT DOCUMENTS

DE    692 00 931    8/1992

(Continued)

*Primary Examiner*—Faye M. Fleming
(74) *Attorney, Agent, or Firm*—Miles & Stockbridge PC (57) ABSTRACT

An impact absorption type steering column apparatus for a vehicle includes a car body securing bracket taking substantially an L-shape as viewed from its side. The car body securing bracket is constructed so that a bent portion and a couple of plate-shaped support wall portions are disposed at the rear side of the vehicle on the car body securing portion, and a couple of column fastening fixation portions are disposed at the front side of the vehicle on these plate-shaped support wall portions. With this layout, when a secondary collision happens, the support wall portions of the car body securing bracket and the column fastening fixation portions start moving in the direction of their rotating about the bent portion as a fulcrum, however, this direction is substantially the horizontal direction and is substantially coincident with an input direction (substantially the horizontal direction) of a load of impact from a driver. Therefore, the start of motion of the car body securing bracket at the secondary collision can be stabilized. In a state where the fastening lever is fixed in a tilt adjusted position, a portion to be hand-held of the fastening lever is disposed on a more anterior side of the vehicle than the proximal end portion, and, when the secondary collision happens, the fastening lever moves towards the front of the vehicle, whereby the safety against the collision on a knee of a passenger can be further enhanced.

5 Claims, 7 Drawing Sheets

U.S. PATENT DOCUMENTS

| | | | |
|---|---|---|---|
| 6,282,978 B1 * | 9/2001 | Kurita | 74/493 |
| 6,799,779 B1 * | 10/2004 | Shibayama | 280/777 |
| 2002/0026848 A1 * | 3/2002 | Kurita | 74/493 |

FOREIGN PATENT DOCUMENTS

| | | |
|---|---|---|
| DE | 696 15 309 | 5/1997 |
| EP | 0 222 628 | 5/1987 |
| EP | 0 770 536 | 5/1997 |
| EP | 0 816 205 | 5/1999 |
| EP | 1 083 109 | 3/2001 |
| EP | 1 223 096 | 7/2002 |
| EP | 1 083 109 | 11/2003 |
| JP | UM 59-101021 | 1/1984 |
| JP | 61-5263 | 1/1986 |
| JP | 62-6073 | 1/1987 |
| JP | 62-51078 | 3/1987 |
| JP | 62-59162 | 3/1987 |
| JP | 62-74767 | 4/1987 |
| JP | 10-16796 | 1/1998 |
| JP | 2978788 | 9/1999 |
| JP | 2000-229577 | 8/2000 |
| JP | 2001-80527 | 3/2001 |

* cited by examiner

SHOCK ABSORBING STEERING COLUMN DEVICE FOR VEHICLE

TECHNICAL FIELD

The present invention relates to an impact absorption type steering column apparatus for a vehicle.

BACKGROUND ART

If an automobile collides against another automobile, a building, etc., a driver of the automobile collides with a steering wheel by its inertia (which will hereinafter be termed a secondary collision in the present specification) in some cases. Cars, etc. in recent years have widely adopted an impact absorption type steering column apparatus in order to prevent the driver from being injured in such a case. In the impact absorption type steering column apparatus, when the driver secondarily collides with the steering wheel, the steering column separates from a the car body together with a steering shaft or the steering column becomes collapsed simultaneously with the steering shaft, whereby an impact energy is absorbed on that occasion.

Some of the impact absorption type steering column apparatuses have an impact energy absorption system that absorbs the impact energy by causing a flexural deformation of a car body securing bracket for securing the steering column to the car body.

Figure 7:
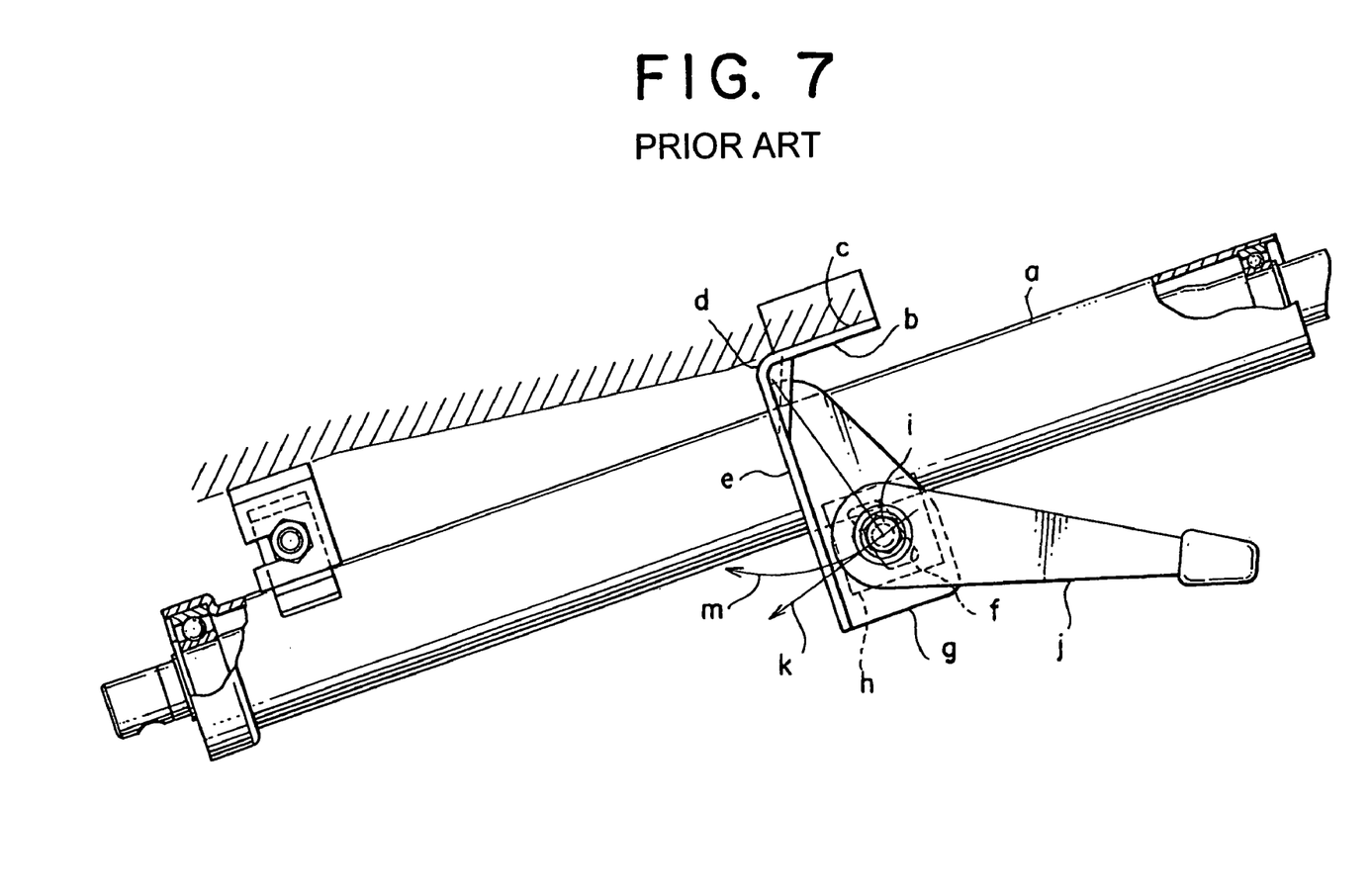
FIG. 7 is a side view showing a state where an impact absorption type steering column apparatus for a vehicle in the prior art is mounted in an actual car.

Such an example is disclosed in Japanese Patent Publication No. 2978788 and Japanese Patent Application Laid-Open Nos. 2000-229577 and 10-16796. FIG. 7 shows one example of the conventional impact absorption type steering column apparatus. A tilt adjustment type steering column a is so secured to the car body as to be tilt-adjustable through a car body securing bracket (tilt bracket) b and has substantially an L-shape when viewed from its side.

This car body securing bracket b with substantially the L-shape as viewed from its side is constructed of a car body securing portion c for securing it to the car body by use of a bolt, etc., a support wall portion e bent substantially in an L-shape through a bent portion d from this car body securing portion c, and a column fastening fixation portion g erected from this support wall portion e formed with a tilt adjustment groove f.

A distance bracket h fixed by welding, etc. to the steering column a is slidably provided inside the car body securing bracket (the tilt bracket) b, and a fastening bolt i is inserted through the tilt adjustment groove f of the column fastening fixation portion g and through the distance bracket h. A fastening lever j fitted to a proximal end portion of this fastening bolt i is swayed towards a driver on the rear side of the vehicle, thereby fixing the car body securing bracket b to the distance bracket h by pressing. Then, the fixation by press-fitting can be canceled by rotating the fastening lever j in the opposite direction.

In the examples disclosed in the Publications of the prior art and in the conventional example in FIG. 7, the bent portion d and the support wall portion e are disposed at the front side of the vehicle on the car body securing portion c, and the column fastening fixation portion g formed with the tilt adjustment groove f is disposed at the rear side of the vehicle on this support wall portion e.

Accordingly, when a secondary collision happens, a secondary impact load acts towards the front from the rear of the vehicle, with the result that the steering column a is forced to move toward the front of the vehicle together with the distance bracket h and the fastening bolt i. On this occasion, the fastening bolt i starts moving, as indicated by an arrowhead (k) in FIG. 7, with the bent portion d serving as a fulcrum, in a direction considerably downwards from the horizontal direction and subsequently, as indicated by an arrowhead (k) in FIG. 7, rotates about the bent portion d. With this action, the support wall portion e of the car body securing bracket and the column fastening fixation portion g become collapsed while causing their flexural deformations so as to rotate about the bent portion d (fulcrum), thereby absorbing an energy of the secondary impact.

In the examples disclosed in the Publications of the prior art and in the conventional example in FIG. 7, however, the bent portion d and the support wall portion e are disposed at the front side of the vehicle on the car body securing portion c, and the tilt adjustment groove f and the column fastening fixation portion g are disposed at the rear side of the vehicle on this bent portion d and the support wall portion e. Therefore, when the secondary collision happens, the fastening bolt i (the support wall portion e of the car body securing bracket b and the column fastening fixation portion g) starts moving, as indicated by the arrowhead (k) in FIG. 7, in a direction of rotating about the bent portion d as a fulcrum, and this direction is considerably downward from the horizontal direction.

On the other hand, the steering column a is secured to the actual car at a tilt angle of approximately 20 through 24 degrees, however, when the secondary collision happens, the impact load on the driver acts substantially horizontally towards the front from the rear of the vehicle.

Accordingly, there is a considerable deviation between the input direction (substantially the horizontal direction) of the impact load and the actual motion starting direction (downward) of the fastening bolt i (the support wall portion e of the car body securing bracket b and the column fastening fixation portion g). As a result, the start of motions of the fastening bolt i and the car body securing bracket b are not necessarily stable.

Further, in the conventional example shown in FIG. 7, the fastening lever j extends at the rear side of the vehicle in the state where the steering column a is fixed in the tilt adjusting position, and hence this fastening lever might, when the support wall portion e of the car body securing bracket b and the column fastening fixation portion g rotate about the bent portion d (fulcrum) upon the secondary collision, fall down, following up these rotations, from an accommodation area within the steering column a and might be positioned in the vicinity of a knee of the driver.

Japanese Patent Application Laid-Open No. 10-16796 takes a countermeasure against this incident, wherein the apparatus is structured to prevent the fastening lever from rotating when the secondary collision happens. This mechanism is, however, complicated requiring an increase in the number of parts, with the result that a rise in the manufacturing cost is brought about.

DISCLOSURE OF THE INVENTION

It is an object of the present invention, which was devised under such circumstances, to provide an impact absorption type steering column apparatus for a vehicle that enhances the safety against the secondary collision.

To accomplish the above object, according to a first aspect of the present invention, in an impact absorption type steering column apparatus for a vehicle comprising a car body securing bracket integrally constructed of a car body securing portion, for securing a steering column to a car body, taking substantially an L-shape as viewed from its side and secured to the car body, a couple of support wall portions bent through a bent portion from the car body securing portion and extending in a transversal direction of the steering column, and a couple of column fastening fixation portions erected on the support wall portions, there is provided an improvement characterized in that the bent portion and the couple of support wall portions are disposed at the rear side of the vehicle on the car body securing portion, and the couple of column fastening fixation portions are disposed at the front side of the vehicle on the support wall portions.

As described above, according to the impact absorption type steering column apparatus for the vehicle in the first aspect of the present invention, the bent portion and the couple of support wall portions are disposed at the rear side of the vehicle on the car body securing portion, and the couple of column fastening fixation portions are disposed at the front side of the vehicle on the couple of support wall portions. With this layout, when the secondary collision happens, the support wall portions of the car body securing bracket and the couple of column fastening fixation portions start moving in the direction of their rotating about the bent portion as the fulcrum, however, this direction is substantially the horizontal direction and is substantially coincident with an input direction (substantially the horizontal direction) of the load of the impact from the driver. Accordingly, the start of motion of the car body securing bracket at the secondary collision can be stabilized.

Further, in the impact absorption type steering column apparatus for the vehicle according to the first aspect of the present invention, preferably the couple of column fastening fixation portions are formed respectively with tilt adjustment grooves.

Moreover, the impact absorption type steering column apparatus for the vehicle according to the first aspect of the present invention preferably further comprises a fastening bolt inserted through the tilt adjustment grooves, and a fastening lever, of which a proximal end portion is fitted to the fastening bolt, swayable between a column fastening position and a column unfastening position, wherein a portion to be hand-held of the fastening lever is disposed at a more anterior side of the vehicle than the proximal end portion.

Furthermore, according to a second aspect of the present invention, in an impact absorption type steering column apparatus for a vehicle comprising a car body securing bracket integrally constructed of a car body securing portion, for securing a steering column to a car body, taking substantially an L-shape as viewed from its side and secured to the car body, a couple of support wall portions bent through a bent portion from the car body securing portion and extending in a transversal direction of the steering column, and a couple of column fastening fixation portions erected on the support wall portions, a fastening bolt inserted through the tilt adjustment grooves, and a fastening lever, of which a proximal end portion is fitted to the fastening bolt, swayable between a column fastening position and a column unfastening position, there is provided an improvement characterized in that a portion to be hand-held of the fastening lever is disposed on a more anterior side of the vehicle than the proximal end portion.

As described above, according to the impact absorption type steering column apparatus in the second aspect of the present invention, in a state where the steering column lever is fixed in a tilt adjusting position, the portion to be hand-held of the fastening lever is disposed on a more anterior side of the vehicle than the proximal end portion, and, when the secondary collision happens, the fastening lever moves towards the front of the vehicle, whereby the safety against the collision on a knee of a passenger can be further enhanced.

EMBODIMENTS OF THE INVENTION

An impact absorption type steering column apparatus for a vehicle in an embodiment of the present invention will hereinafter be described with reference to the drawings.

Figure 1:
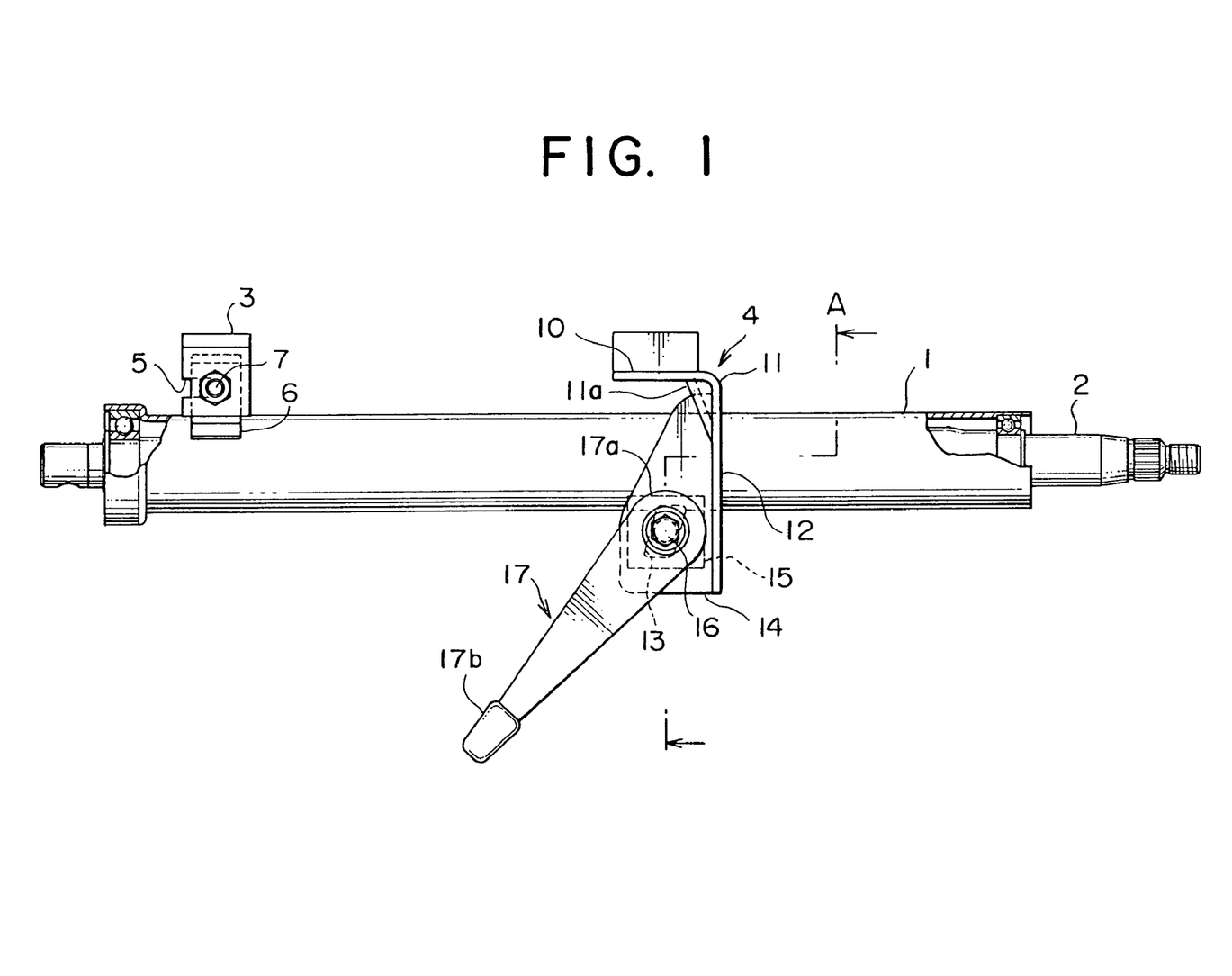
FIG. 1 is a side view of an impact absorption type steering column apparatus for a vehicle in an embodiment of the present invention.
Figure 2:
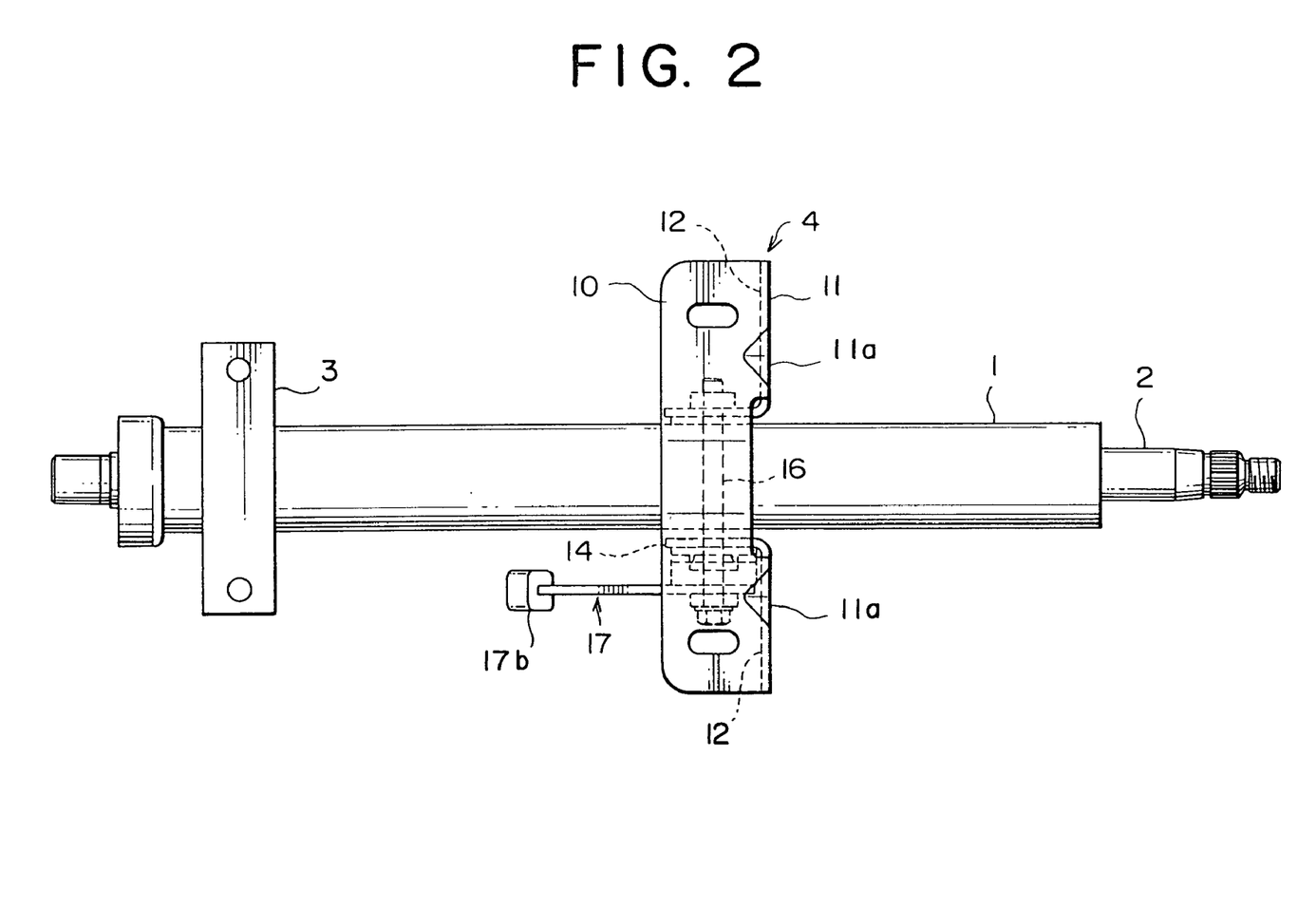
FIG. 2 is a plan view of the impact absorption type steering column apparatus for the vehicle shown in FIG. 1.
Figure 3:
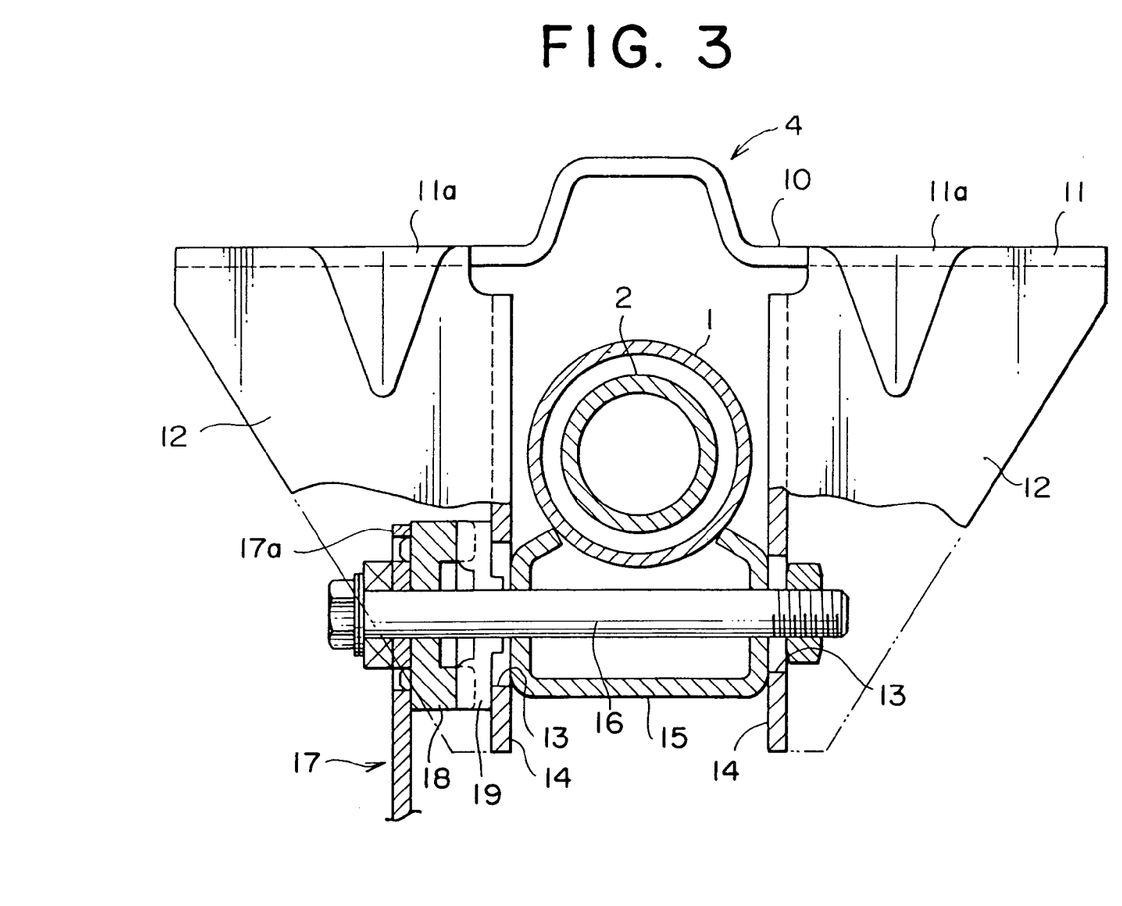
FIG. 3 is a sectional view taken along the line A—A in FIG. 1.
Figure 4:
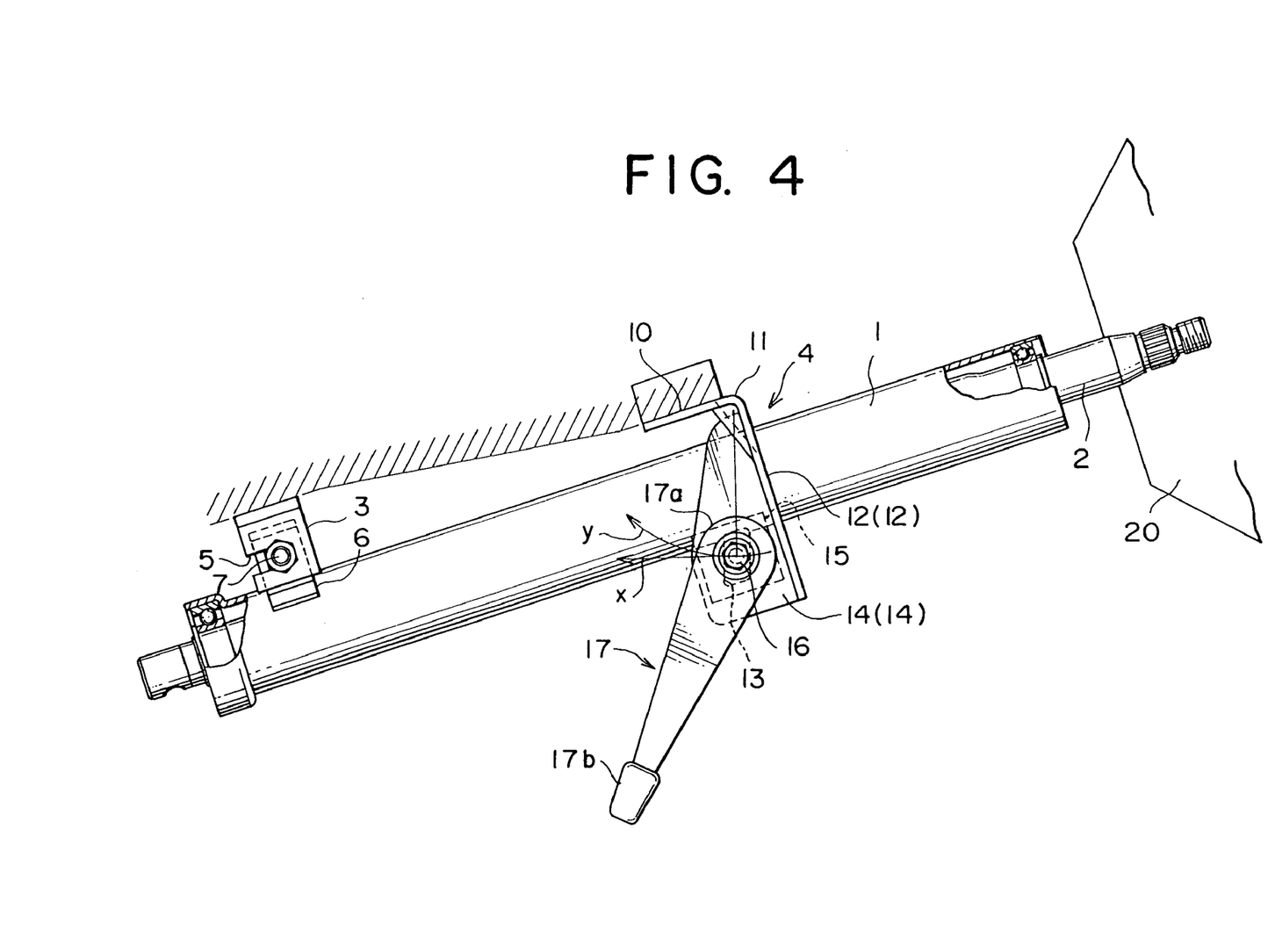
FIG. 4 is a side view showing a state where the impact absorption type steering column apparatus for the vehicle shown in FIG. 1 is mounted in an actual car.
Figure 5:
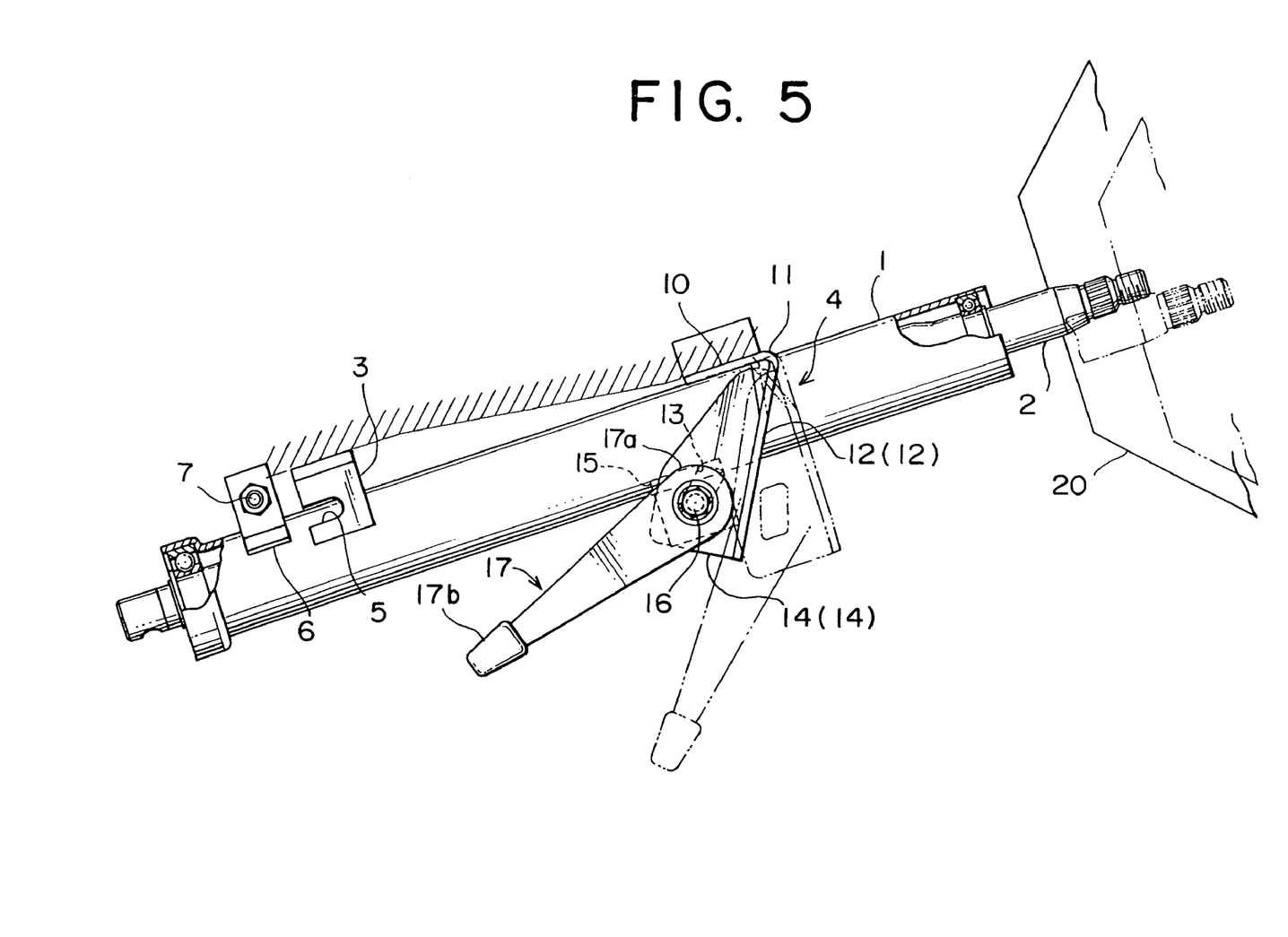
FIG. 5 is a side view showing a secondary collision in the state where the impact absorption type steering column apparatus for the vehicle is mounted in the actual car.
Figure 6:
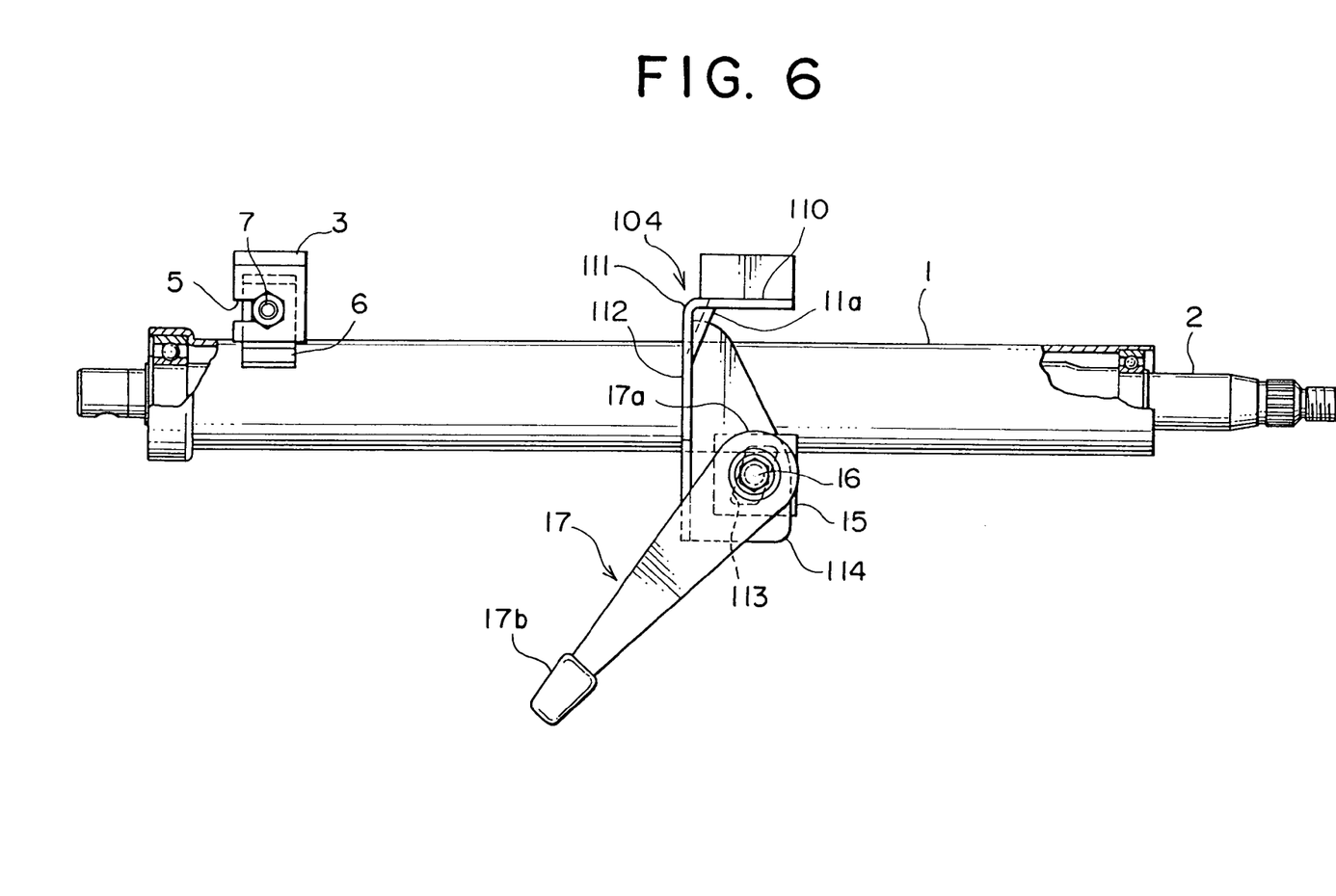
FIG. 6 is a side view of the impact absorption type steering column apparatus for the vehicle in another embodiment of the present invention.

FIG. 1 is a side view of the impact absorption type steering column apparatus for the vehicle according to the embodiment of the present invention. FIG. 2 is a plan view of the impact absorption type steering column apparatus for the vehicle shown in FIG. 1. FIG. 3 is a sectional view taken along the line A—A in FIG. 1. FIG. 4 is a side view showing a state where the impact absorption type steering column apparatus for the vehicle is mounted in an actual car. FIG. 5 is a side view showing the state where the impact absorption type steering column apparatus for the vehicle is mounted in the actual car, and also showing a state of the secondary collision. FIG. 6 is a side view of the impact absorption type steering column apparatus for the vehicle in another embodiment of the present invention.

As shown in FIG. 1, a steering shaft 2 is rotatably supported within a steering column 1 to which a steering wheel (that is not shown in FIGS. 1 and 2) is fixed on the right side end in FIG. 1. This steering column 1 is secured to a car body through a lower bracket 3 at its lower end portion and a car body securing bracket 4 (a tilt bracket) taking substantially an L-shape as viewed from its side at its middle portion.

The lower bracket 3 is formed with a cut-away portion opened to the front of the vehicle, and a tilt center bolt 7 fitted to the bracket 6 of the steering column 1 is engaged with this cut-away portion 5. With this contrivance, when the secondary collision happens, the steering column 1 becomes movable towards the front of the vehicle.

The car body securing bracket 4 taking substantially the L-shape as viewed from its side is constructed integrally of a car body securing portion 10 for securing to the car body through a bolt, etc. extending in the horizontal direction in FIG. 3, a couple of plate-shaped support wall portions 12, 12 bent substantially in the L-shape as viewed from the side through a bent portion 11 from this car body securing portion 10 and extending in the transversal direction of the steering column 1, and a couple of plate-shaped column fastening fixation portions 14, 14 erected from the couple of plate-shaped support wall portions 12, 12 and extending in the axial directions on both sides of the steering column 1. These column fastening fixation portions 14, 14 are formed respectively with tilt adjustment grooves 13, 13 for adjusting the steering column in a tilt adjusting position.

A distance bracket 15 fixed by welding, etc. to the steering column 1 is provided in a way that brings both of side end surfaces of this bracket 15 into contact with the insides of the couple of column fastening fixation portions 14, 14 of the car body securing bracket (the tilt bracket) 4. A fastening bolt 16 is inserted through the couple of tilt adjustment grooves 13, 13 of the couple of column fastening fixation portions 14, 14 and through the both side end surfaces of the distance bracket 15. A fastening lever 17 is secured to a proximal end portion of this fastening bolt 16.

As shown in FIG. 3, the proximal end portion of the fastening bolt 16 is provided with a cam lock mechanism provided with a first cam 18 rotating with the fastening lever 17 and a non-rotatable second cam 19 engaging with and thus locked to the first cam 18.

With this configuration, the fastening lever 17 is swayable between a fastening position and a unfastening position, and, when rotated to the fastening position, the steering column 1 is fixed to the tilt adjusted position in a way that fixedly abuts the two side end surfaces of the distance bracket 15 by pressing through the couple of column fastening fixation portions 14, 14 of the car body securing bracket 4 by dint of a function of the cam lock mechanism. On the other hand, when the fastening lever 17 is rotated to the unfastening position, the distance bracket 15 is unfastened, whereby the steering column comes into a tilt position adjustable state.

According to this embodiment, the fastening lever 17 is constructed so that when the fastening lever 17 is in a state of being fixed to the tilt adjusted position, a portion to be hand-held of the fastening lever 17 is disposed on the more anterior side of the vehicle than the proximal end portion 17a thereof.

According to this embodiment, as illustrated in FIGS. 2 and 3, the bent portion 11 of the car body securing bracket 4 is formed with a reinforcing bead 11a, wherein a bending load occurred when the second collision happens can be adjusted by changing a size of this reinforcing bead 11a.

As shown in FIG. 4, in the state where the impact absorption type steering column apparatus for the vehicle in this embodiment is mounted in the actual car, the bent portion 11 and the couple of plate-shaped support wall portions 12, 12 are disposed at the rear side of the vehicle on the car body securing portion 10 of the car body securing bracket 4, and the couple of column fastening fixation portions 14, 14 are disposed at the front side of the vehicle on the plate-shaped support wall portions 12, 12. The fastening bolt 16 is thereby positioned below the bent portion 11 substantially in the vertical direction.

With the configuration described above, when the load of the secondary collision acts forwards on the steering wheel 20 from the rear side of the vehicle upon the occurrence of the secondary collision, the steering column 1 is forced to move forward together with the distance bracket 15 and the fastening bolt 16.

On this occasion, the impact load on the driver acts substantially horizontally towards the front side from the rear side of the vehicle. On the other hand, the fastening bolt 16 is disposed below the bent portion 11 substantially in the vertical direction. The fastening bolt 16 starts moving, as indicated by an arrowhead (x) in FIG. 4, substantially in the horizontal direction with the bent portion 11 used as a fulcrum, and subsequently rotates about the bent portion 11 (fulcrum) as indicated by an arrowhead (y).

With this action, as shown in FIG. 5, the impact absorption type steering column apparatus for the vehicle in this embodiment gets collapsed while causing its flexural deformation in such a way that the couple of plate-shaped support wall portions 12, 12 of the car body securing bracket 4 and the couple of column fastening fixation portions 14, 14 rotate about the bent portion (fulcrum) 11, thereby absorbing an energy of the secondary impact.

Thus, according to this embodiment, the bent portion 11 and the couple of plate-shaped support wall portions 12, 12 are disposed at the rear side of the vehicle on the car body securing portion 10, and the couple of column fastening fixation portions 14, 14 are disposed at the front side of the vehicle on these plate-shaped support wall portions 12, 12. With this layout, when the secondary collision happens, the couple of plate-shaped support wall portions 12, 12 of the car body securing bracket 4 and the couple of column fastening fixation portions 14, 14, start moving in the direction of their rotating about the bent portion 11 serving as the fulcrum, however, this direction is substantially the horizontal direction and is substantially coincident with an input direction (substantially the horizontal direction) of the load of the impact from the driver. Accordingly, the start of motion of the car body securing bracket 4 at the secondary collision can be stabilized.

Further, according to this embodiment, in the state where the fastening lever 17 is fixed in the tilt adjusted position, the portion to be hand-held 17b of the fastening lever 17 is disposed at a more anterior side of the vehicle than the proximal end portion 17a thereof. Besides, when the secondary collision happens, as shown in FIG. 5, the fastening lever 17, following up the collapse of the car body securing bracket 4, moves towards the front of the vehicle while rotating, whereby safety against the collision on the knee of a passenger can be further enhanced.

FIG. 6 shows a side view of the impact absorption type steering column apparatus for the vehicle in still another embodiment of the present invention. A different point of this embodiment from the embodiment discussed above lies in a structure of the car body securing bracket. In this embodiment, a bent portion 111 and a couple of plate-shaped support wall portions 112, 112 are disposed at the front side of the vehicle on a car body securing portion 110 of a car body securing bracket 104. A couple of column fastening fixation portions 114, 114 are disposed at the rear side of the vehicle on the plate-shaped support wall portions 112, 112 and are formed respectively with tilt adjustment grooves 113, 113. Other constructions are the same as those in the embodiment discussed above and marked with the same symbols, and their explanations are omitted.

The apparatus being configured described above, when the secondary collision happens, the secondary impact load acts toward the front from the rear of the vehicle, with the result that the steering column 1 is forced to move toward the front side of the vehicle together with a distance bracket 15 and a fastening bolt 16. On this occasion, the fastening bolt 16 starts moving, with the bent portion 111 serving as a fulcrum, in a direction considerably downwards from the horizontal direction and rotates about the bent portion (fulcrum) 111. With this action, the impact absorption type steering column apparatus gets collapsed while causing its flexural deformation in such a way that the couple of plate-shaped support wall portions 112, 112 of the car body securing bracket 104 and the couple of column fastening fixation portions 114, 114 rotate about the bent portion (fulcrum) 111, thereby absorbing an energy of the secondary impact.

Further, also in this embodiment, in the state where the fastening lever 17 is fixed in the tilt adjusted position, the portion to be hand-held 17b of the fastening lever 17 is disposed at the more anterior side of the vehicle than the proximal end portion 17a thereof, and, besides, when the secondary collision happens, the fastening lever 17, following the collapse of the car body securing bracket 104, moves towards the front of the vehicle while rotating, whereby safety against the collision on the knee of the passenger can be further enhanced.

Note that the present invention is not limited to the embodiments discussed above and can be modified in many ways. For example, in the embodiments discussed above, the present invention is applied to the car body securing bracket (the tilt bracket) and may also be applied to the lower bracket.

As described above, according to the present invention, it is possible to provide the impact absorption type steering column apparatus for a vehicle that further enhances safety against a secondary collision.

What is claimed is:

1. An impact absorption type steering column apparatus for a vehicle, comprising:
   a vehicle body securing bracket which is generally L-shaped as viewed from its side and secured to a vehicle body, said vehicle body securing bracket being integrally constructed of a vehicle body securing portion for securing a steering column to the vehicle body, a pair of support wall portions bent from said vehicle body securing portion and extending in a transverse direction of said steering column, and a pair of column fastening fixation portions on attached to said support wall portions,
   wherein said pair of column fastening fixation portions extend toward a front of the vehicle from said support wall portions.

2. An impact absorption type steering column apparatus for a vehicle according to claim 1, wherein said pair of column fastening fixation portions are formed respectively with tilt adjustment grooves.

3. An impact absorption type steering column apparatus for a vehicle according to claim 1, further comprising a fastening bolt inserted through tilt adjustment grooves, and a fastening lever of which a proximal end portion is fitted to said fastening bolt and being movable between a column fastening position and a column unfastening position,
   wherein a portion to be hand-held of said fastening lever is disposed closer than the proximal end portion to the front of the vehicle.

4. An impact absorption type steering column apparatus for a vehicle, comprising:
   a vehicle body securing bracket which is generally L-shaped as viewed from its side and secured to a vehicle body, said vehicle body securing bracket being integrally constructed of a vehicle body securing portion for securing a steering column to the vehicle body, a pair of support wall portions bent from said vehicle body securing portion and extending in a transverse direction of said steering column, and a pair of column fastening fixation portions attached to said support wall portions;
   a fastening bolt inserted through tilt adjustment grooves; and
   a fastening lever of which a proximal end portion is fitted to said fastening bolt and being movable between a column fastening position and a column unfastening position,
   wherein a portion to be hand-held of said fastening lever is closer than the proximal end portion to a front of the vehicle when the fastening lever is at the column fastening position.

5. An impact absorption type steering column apparatus for a vehicle according to claim 2, further comprising a fastening bolt inserted through said tilt adjustment grooves, and a fastening lever of which a proximal end portion is fitted to said fastening bolt and being movable between a column fastening position and a column unfastening position,
   wherein a portion to be hand-held of said fastening lever is disposed closer than the proximal end portion to the front of the vehicle.

* * * * *